R. L. Stevens.
Screw Propeller.
No. 2,821.   Patented Oct. 17, 1842.

R. L. Stevens.
Screw Propeller.

N° 2,821. Patented Oct. 17, 1842.

Sheet 2, 3 Sheets

R. L. Stevens.
Screw Propeller.

N° 2,821.    Patented Oct. 17, 1842.

UNITED STATES PATENT OFFICE.

ROBERT L. STEVENS, OF NEW YORK, N. Y.

MANNER OF CONSTRUCTING, PROPELLING, AND TURNING STEAMSHIPS.

Specification of Letters Patent No. 2,821, dated October 17, 1842.

*To all whom it may concern:*

Be it known that I, ROBERT L. STEVENS, of the city of New York, in the State of New York, have made certain Improvements in the Manner of Constructing Vessels Which are to be Propelled by Steam, which improvements consist, first, in the manner in which I form the vessel and the propelling apparatus and combine them with each other; and, second, in a new and useful manner of turning a vessel around either side to, which may be effected in a narrow channel without its being necessary to move here either ahead or astern; and I do hereby declare that the following is a full and exact description of my said improvements.

The propeller, or propellers, which I intend to employ, is furnished with vanes, or buckets which are placed around a shaft; the axis of which stands horizontally, so that the vanes, or buckets, shall revolve vertically, in the manner of those essayed by Col. John Stevens at New York, in, or about the year 1801, and since that period frequently tried by others. The vanes of said propellers are to be so curved and arranged that each of them shall constitute a segment of a spiral, set around a common center; of these vanes, or buckets, there may be six or eight, more or less, to each -propeller. In the use of propellers of this description, the principal difficulty has arisen from the obstruction occasioned by the water at, or near, their centres, or shafts; this difficulty I remove by forming and carrying out the hull of the vessel, toward the stern, in such manner as that it shall terminate in a cone; and around a suitable part of this cone, the vanes, or buckets, are to be arranged. That part of the cone to which the vanes are attached, together with the whole portion extending thence to its apex, is made to revolve, and is supported by means of a strong shaft extending forward from it, through the axis of the stationary part of the cone, so as to be acted upon by the steam-engine. The diameter of that part of the cone to which the propellers are attached may constitute a large proportion of the whole diameter of the wheel, say from one third to one half, more or less. I intend sometimes to use a single propelling wheel of the kind above described; but I contemplate, also, the employment of two such wheels, which may be made to revolve in reversed directions.

In this case, I form two conical bodies, one on each side of the vessel, each of which carries, and constitutes a part of a revolving propeller.

Figure 1:
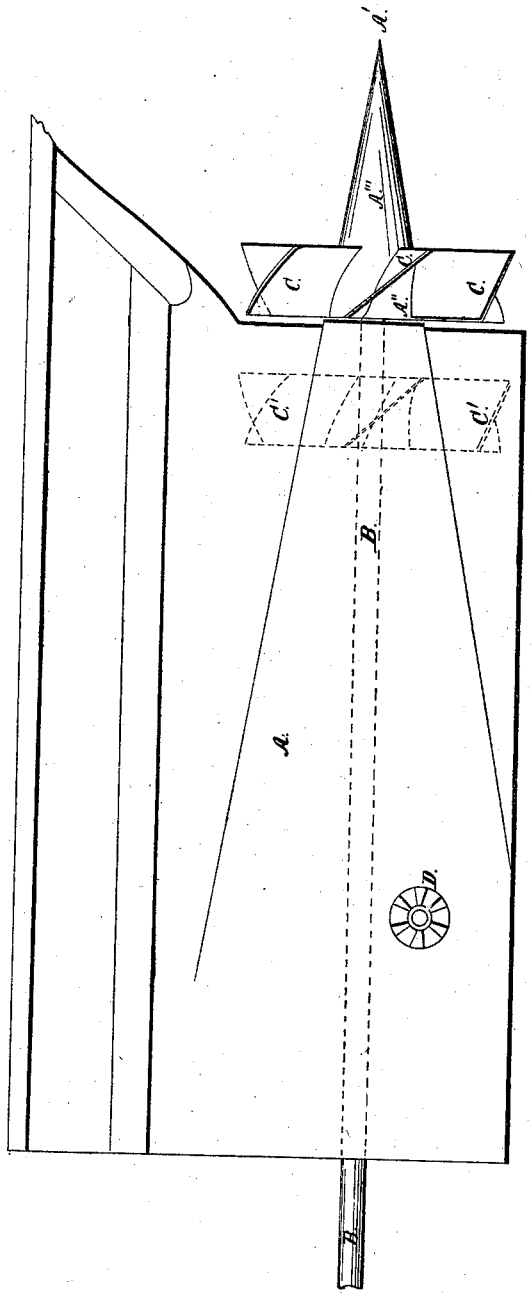

In the accompanying drawing Figure 1, is a side view of the after part of a vessel, with a single propeller. At a suitable part on each side of the vessel, dependent upon her mold as at A, the conical body which is to be constructed, is begun to be formed, and this is carried back until it terminates in a point as at A'; the part of the cone A''', extending from its point, A', to A'', is allowed to revolve, and for this purpose it is attached to a shaft B, B, which extends forward through the center of the conical body A, to the engine. This shaft is surrounded by a stuffing box, where it escapes from the cone A, as at A''. The vanes, or buckets, C, C, are shown as attached near to the base of the revolving part of the cone; these buckets are intended to be kept entirely below the water line.

Figure 2:
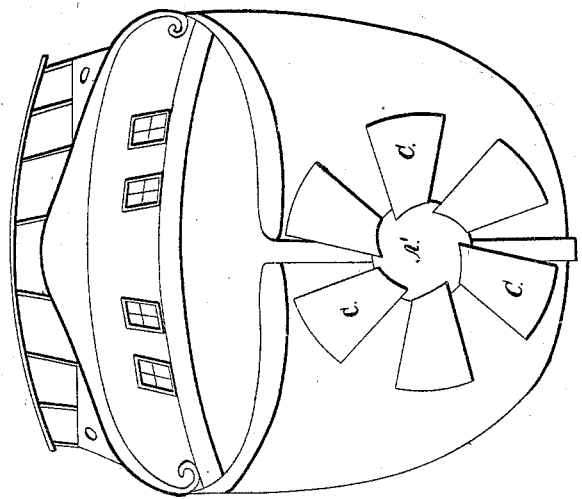

Fig. 2, is a stern view of a vessel having a single propelling wheel of the kind herein described. In this case, as the wheel occupies the ordinary position of the rudder, the vessel may be steered by a double rudder situated below the counter, or in other known ways. By this mode of construction the center portion of the wheel is not in any way acted upon by the water, and this fluid is made to pass off from the wheel, and from the vessel, along the cone, in the same direction in which it meets the wheel, and which it naturally tends to assume in the vessel's progress.

Figure 3:
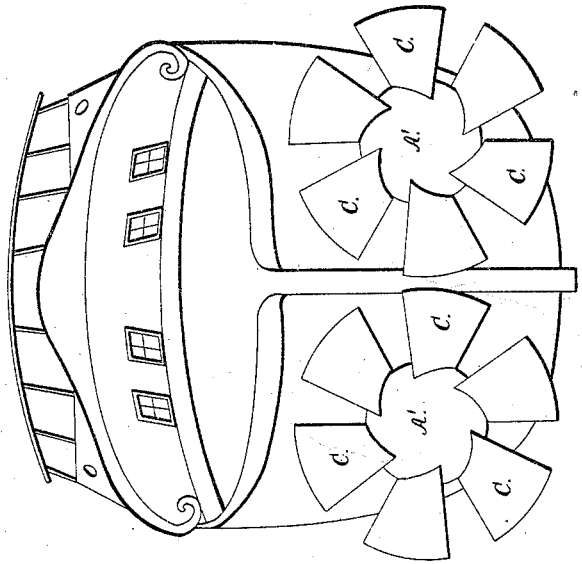
Figure 5:
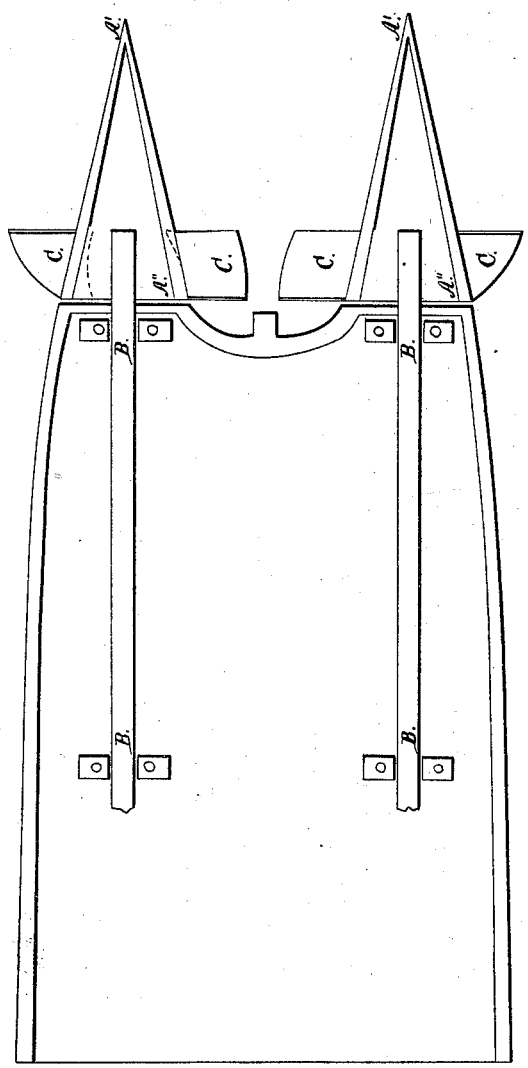

Fig. 3, represents the stern of a vessel having two propelling wheels of the kind above described, which are shown in a horizontal section through their axes in Fig. 5. When these are used, a cone is formed on each side of the vessel, is extended aft, and has a revolving portion, with a shaft passing forward through the stationary part of the cone, as described in the case of the employment of one wheel only. The rudder, when two wheels are used, may occupy its usual place. The vanes, or buckets, are to be so curved, or twisted, as to adapt their respective parts to their action upon the water as resulting from the rapidity of their revolution. From the large diameter of the part to which they are attached, they may be very firmly fixed in place; and the buoyancy of the revolving part of the cone may be such as to sustain the whole weight of the wheel, and thus diminish its friction upon its bearings. When two propelling wheels are used, they may be located forward of the stern post, under the counter, as shown by the dotted lines at C', Fig. 1.

The following is the manner in which I construct the apparatus by means of which I turn a vessel around, either side to; I construct a tube of such diameter as may be required by the size of the vessel, say from four to six feet; and of such length as to extend from side to side, through the hold, near either to the stem or the stern, but preferring the latter, as most convenient. Within this tube I place a spiral propelling wheel which may be made to revolve in either direction, so as to produce a rapid current of water across from one side of the vessel to the other; the effect of which will be to cause her to turn around, as upon a pivot. The propeller in this tube may be driven by a small engine constructed for that purpose, and which may be supplied with steam from the boiler of the main engine.

Figure 4:
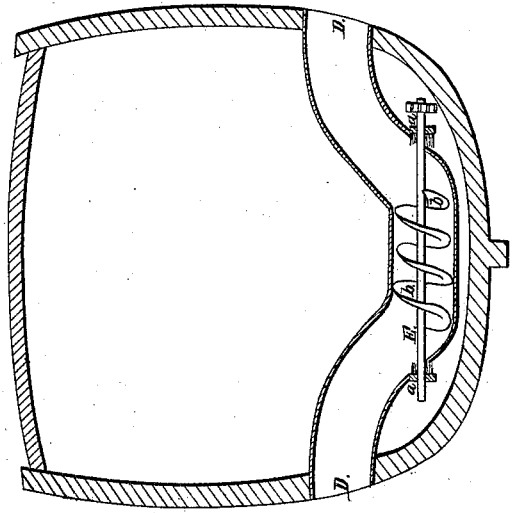

In Fig. 1, D, shows the opening into one end of the above named tube. Fig. 4, is a vertical cross section of the vessel through said tube, which is made to curve down toward its middle for the purpose of passing the shaft of the propeller through it; E, is the propeller-shaft which passes through stuffing boxes at $a$, $a$, so as to occupy the middle of that part of the tube which contains the spiral propellers, shown at $b$, $b$; the shaft E, may be turned by any suitable gearing.

Having thus, fully described the nature of my improvements in the manner of constructing and of propelling vessels that are to be navigated by steam, what I claim therein as new, and desire to secure by Letters Patent, is, 1. The so forming of a vessel as that the after part of the hull shall terminate in one or two cones, in the manner set forth; the after part of such cone, where it equals one-third or one-half of the whole diameter of the propelling wheel, more or less, constituting the central portion of a spiral propelling wheel, revolving with it, and being sustained and driven by a shaft extended forward through the axis of the stationary part of the cone; the whole being constructed, and operating, substantially in the manner, and for the purpose, herein set forth.

2. I claim the turning of a vessel round, either side to, by the passing of a hollow tube through the hold of such vessel, toward either of her ends, in the manner set forth, and by causing a current of water to pass through said tube, in either direction, by means of a spiral propeller made to revolve within said tube, as herein fully described.

ROBT. L. STEVENS.

Witnesses:
 THOS. P. JONES,
 EDWIN L. BRUNDAGE.